United States Patent [19]

Otoshima

[11] Patent Number: 5,676,325
[45] Date of Patent: Oct. 14, 1997

[54] TRAVERSE APPARATUS FOR A YARN WINDING MACHINE

[75] Inventor: Hirao Otoshima, Shiga-gun, Japan

[73] Assignee: Murata Kikai Kabushiki Kaisha, Kyoto, Japan

[21] Appl. No.: 621,485

[22] Filed: Mar. 25, 1996

[30] Foreign Application Priority Data

Apr. 14, 1995 [JP] Japan .................. 7-114003

[51] Int. Cl.⁶ .................. B65H 57/28; B65H 54/28; F16F 5/00
[52] U.S. Cl. .................. 242/158.3; 242/43 R; 267/113; 267/116
[58] Field of Search ............... 242/158 R, 158.2, 242/158.3, 43 R; 267/113, 116

[56] References Cited

U.S. PATENT DOCUMENTS

| | | | |
|---|---|---|---|
| 1,527,485 | 2/1925 | Malassine et al. | 242/43 R |
| 2,301,699 | 11/1942 | Helland | 242/43 R X |
| 2,964,260 | 12/1960 | Edelman et al. | 242/158 R |
| 3,193,207 | 7/1965 | Sear et al. | 242/43 R X |
| 3,799,464 | 3/1974 | Bosch | 242/158.3 X |
| 3,858,818 | 1/1975 | Melz | 242/43 R |
| 4,113,194 | 9/1978 | Hensley | 242/43 R |
| 4,583,699 | 4/1986 | Karlsson | 242/158.3 X |

*Primary Examiner*—Michael Mansen
*Attorney, Agent, or Firm*—Armstrong, Westerman Hattori, McLeland & Naughton

[57] ABSTRACT

A traverse apparatus for a yarn winding machine which non-linearly buffers the impact between the cam drum (4) and cam roller (13) due to the emission resistance and shear resistance of the viscous fluid (b) intervening between shock absorbers ($10a, 10b, 10a', 10b'$) arranged at the return point and reciprocally moving slide members ($9, 9'$) connected to a traverse rod (14). As the impact between the cam drum (4) and cam roller (13) is sharply non-linearly buffered due to the to the emission resistance and shear resistance of the oil, noise generated when the cam roller returns can be reduced and the decrease in durability of the traverse device caused by the aforementioned impact can be prevented.

19 Claims, 5 Drawing Sheets

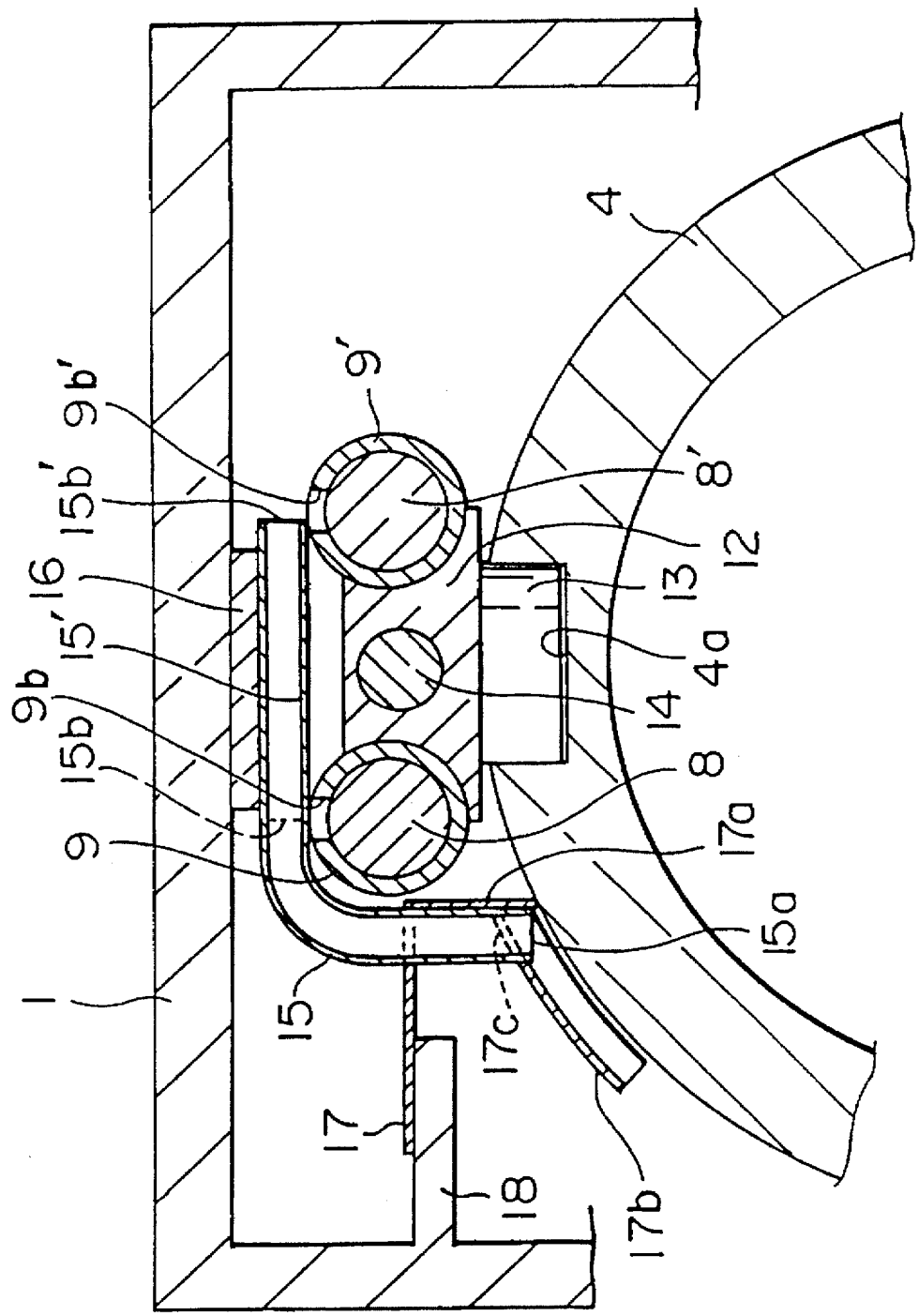

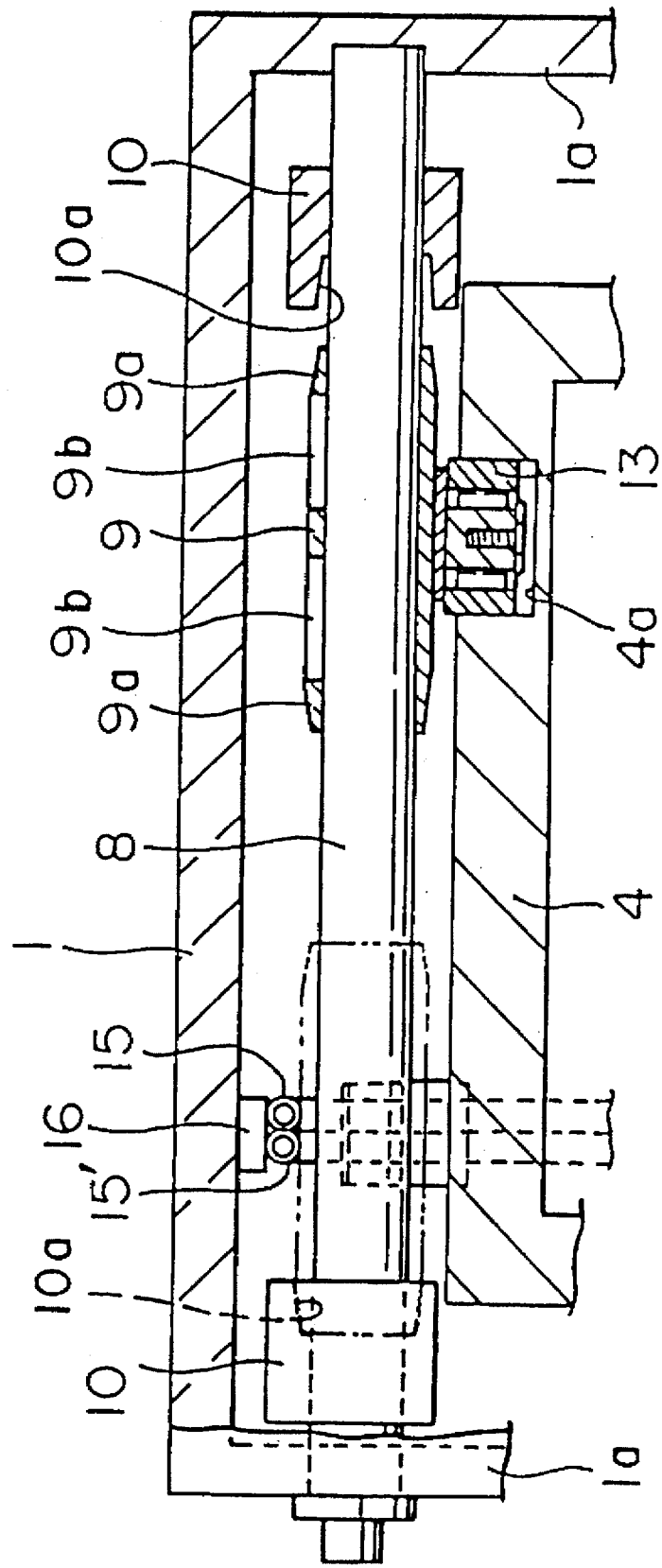

TRAVERSE APPARATUS FOR A YARN WINDING MACHINE

FIELD OF THE INVENTION

This invention relates to a traverse apparatus for yarn winding machine that traverses the yarn with a traverse guide.

BACKGROUND OF THE INVENTION

Conventionally, a traverse apparatus of a yarn winding machine has been known that traverses yarn by a traverse guide attached to a traverse rod that is reciprocally moved via a cam roller engaged with a cam groove of a cam drum.

On a conventional traverse apparatus of a yarn winding machine as described above, noise is generated by the mechanical shock of the cam drum and cam roller impacting when the cam roller engaged with the cam groove of the cam drum returns. This kind of mechanical impact has a detrimental effect on the durability of the traverse apparatus of a winding machine.

SUMMARY OF THE INVENTION

It is a primary object of the present invention to propose a traverse apparatus of a winding machine that solves the aforementioned problems with conventional apparatus and can increase the speed of the traverse apparatus.

In order to achieve the above mentioned objects, the present invention is a travers apparatus that non-linearly absorbs the impact between the cam drum and the cam roller by the emission resistance and/or shear resistance of the viscous fluid intervening between the shock absorber arranged in the vicinity of the return point and the reciprocally moving slide member which is connected to the traverse red.

BRIEF DESCRIPTION OF THE DRAWINGS

FIG. 2 is an enlarged sectional view of one part along the line II—II of FIG. 1.

FIG. 3 is an enlarged vertical section view along the longitudinal direction of one part of the traverse apparatus of the winding machine of the present invention.

DETAILED DESCRIPTION OF THE PREFERRED EMBODIMENT

Figure 1:
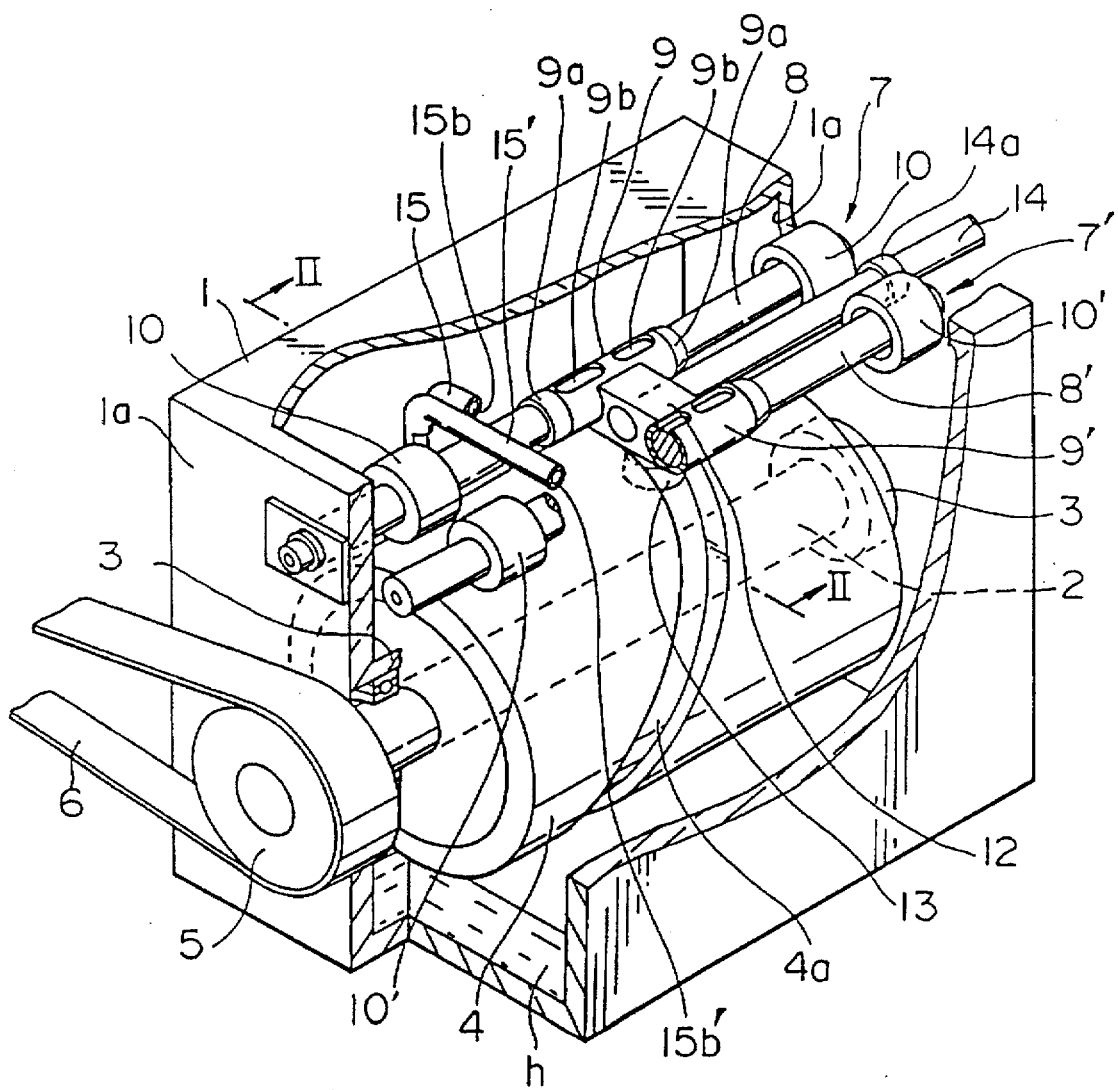
FIG. 1 is a perspective view including a partial section of the traverse apparatus of the winding machine of the present invention.

Below, with reference to FIGS. 1–6, the traverse apparatus of the winding machine of the present invention will be explained but it should be noted that, provided the objects are not exceeded, the present invention is not limited to the present embodiments.

(1) is a box-shaped cam box. (2) is a rotating shaft supported by bearings (3,3) attached to the opposing side walls (1a,1a) of the cam box (1). A cam drum (4) having a cam groove (4a) is attached to the rotating shaft (2). (5) is a pulley attached to one end of the rotating shaft (2) extending outside of the cam box (1) and a belt (6) which transmits the rotation of a pulley (not shown in the drawings) is stretched around the pulley (5). Consequently, the cam drum (4) attached to the rotating shaft (2) rotates due to the pulley (5) being rotated by the belt (6).

(7,7') are a pair of traverse rod support members arranged above the rotating shaft (2). As the traverse rod support member (7) and the traverse rod support member (7') are of the same structure, the traverse rod support member (7) positioned on the left of FIG. 1 will be explained but the other traverse rod support member (7') on the right, being the same element, uses the same figures as the traverse rod support member (7) but with a dash (') added.

(8) is a support shaft of the traverse rod support member (7) attached to the opposing walls (1a,1b) of the aforementioned cam box (1) and is above and parallel to the rotating shaft (2). That support shaft (8) is positioned horizontally parallel to another support shaft (8') of the other traverse rod support member (7').

(9,9') are slide cylinder inserted onto the support shafts (8,8') so as to be slidable. Both ends of the slide cylinders (9,9') are formed into tapers (9a,9a) and a suitable number of long holes (9b,9b') are bored into the top part of the slide cylinders (9,9').

(10,10) are cylindrical shock absorbers attached to both ends of the support shaft (8). Taper slits (10a,10a) into which tapers (9a,9a) formed on both ends of the aforementioned slide cylinder (9) are insertable, are formed on the sides of the cylindrical shock absorbers (10,10) opposing the ends of said shock absorbers (10,10). Similarly, shock absorbers (10',10') are attached to either end of the other support shaft (8') respectively.

(12) is a connecting block attached to opposing peripheral sides of each of the pair of slide cylinders (9,9') so as to connect each. A cam roller (13) engaged with the cam groove (4a) of the aforementioned cam drum (4) is attached to the lower side of the connecting block (12) and can rotate freely. Also, the end of a traverse rod (14) on which traverse guides corresponding to the plurality of winding units of the winding machine (not shown in the drawings) are arranged at suitable intervals, is attached to the connecting block (12). (14a) is the bearing for the traverse rod (14) and is attached to one wall (1a) of the cam box (1).

The cam drum (4) attached to the rotating shaft (2) rotates due to the rotation of the pulley (5) by the belt (6) which transmits the rotation of the pulley (not shown in the drawings) and due to the rotation of the cam drum (4), the cam roller (13) inserted in the cam groove (4a) of the cam drum (4) carries out a reciprocating movement in the axial direction of the cam drum (4). Due to the reciprocal movement of the cam roller (13), the connecting block (12) to which the cam roller (13) is attached and which connects the slide cylinders (9,9') similarly reciprocally moves. Due to the reciprocal movement of this connecting block (12), the traverse rod (14) attached to the connecting block (12) reciprocally moves and consequently, the yarn guided by the traverse guide (not shown in the drawings) attached to the traverse rod (14) is traversed.

The aforementioned shock absorbers (10,10) are attached to the ends of the support shaft (8) at a spacing so that the tapers (9a,9a) of the slide cylinder (9) is inserted into the taper slits (10a,10a) of the shock absorbers (10,10) when the slide cylinder (9) which reciprocally moves due to the reciprocal movement of the cam roller (13) inserted in the cam groove (4a) of the cam drum (4) is returned at both traverse ends. Similarly, the other pair of shock absorbers (10',10') are attached to the ends of the support shaft (8') at a spacing so that the tapers of the slide cylinder (9') is inserted into the taper slits of the shock absorbers (10',10') when the slide cylinder (9') is returned at both traverse ends.

(15) is an oil supply pipe positioned on the side of one pair of shock absorbers (10',10') via a suitable frame (16) inside the cam box (1). The lower end (15a) of the oil supply pipe (15) is positioned close to the cam drum (4) and the upper end (15b) of the oil supply pipe (15) is positioned above one support shaft (8).

(17) is a scrape-off plate that is attached to an appropriate frame (18) inside the cam box (1), whose tip (17a) is close to the cam drum (4) and which can scrape-off oil applied to the cam drum (4). A conduit pipe shaped part (17b) extending along the peripheral surface of the cam drum (4) is formed on scape-off plate (17) as well as hole (17c) bored in the lower end (15a) of the oil supply pipe (15). The oil supply pipe (15') having a similar structure to the aforementioned oil pipe (15) is arranged so that end part (15b') is positioned above the other support shaft (8').

(h) is a viscous oil such as a lubricating oil (hereinafter simply referred to as "oil") stored in the bottom of the cam box (1) in sufficient amounts so that the oil (h) contacts one part of the surface of the cam drum (4).

It should be noted that the lower end of the oil supply pipes (15,15') is curved along the peripheral surface of the cam drum (4) but the aforementioned scrape-off plate (17) can be omitted by forming the curved part into a conduit pipe shape with the lower end open.

Due to the rotation of the cam drum (4), the oil (h) stored in the bottom of the cam box (1) is applied to the surface of the cam drum (4). The oil (h) attached to the surface of the cam drum (4) is scraped off by the tip (17a) of the scrape-off plate (17) and enters the oil supply pipes (15,15') while passing through the conduit pipes (17b) of the scrape-off plate (17). The oil (h) in the oil supply pipes (15,15') is pushed up by the oil (h) continuously supplied to the oil supply pipes (15,15') due to the rotation of the cam drum (4) and the oil (h) falls onto each of the support shafts (8,8') from the upper ends (15b,15b') of the oil supply pipes (15,15').

In this way, the oil (h) is supplied to the support shafts (8,8') and the oil (h) is always applied to the support shafts (8,8'). Also, when the slide cylinder (9) is positioned below the upper ends (15b,15b') of the oil supply pipes (15,15'), the oil (h) that drops from the upper ends (15b,15b') of the oil supply pipes (15,15') is supplied to the support shafts (8,8') through the hole (9b) bored into the top of the slide cylinder (9).

Next, with reference to mainly FIGS. 4A, 4B and 4C, the shock absorber actions by the slide cylinder (9) inserted on one of the support shafts (8) so as to be freely slidable and the shock absorber (10a) attached to the one end of the aforementioned support shaft (8) will be described.

It should be noted that the later described shock absorber actions are carried out even between the slide cylinder (9) and the shock absorber (10b) attached to the other end of the support shaft (8) and similarly even between the slide cylinder (9') inserted on the other support shaft (8') and the shock absorbers (10',10') attached to the support shaft (8') but that description has been omitted.

The slide cylinder (9) moves to the right while scaping up the oil (h) which has dropped from the upper end (15b) of the oil supply pipe (15) and is attached to the support shaft (8) by the movement to the right of the slide cylinder (9).

Figure 4A:
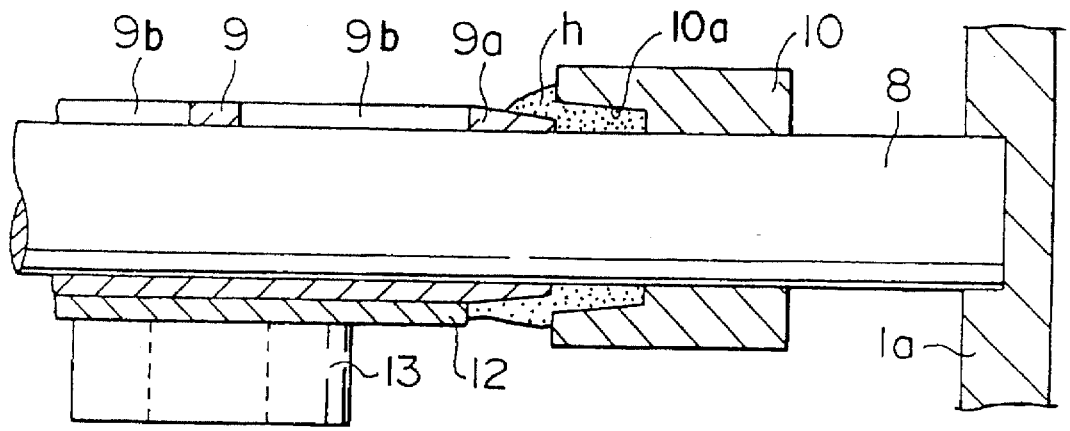
FIG. 4 is an enlarged vertical section view of one part of the area of the return point of the traverse apparatus of the winding machine of the present invention.

Consequently, as shown in FIG. 4A, immediately before the taper (9a) of the slide cylinder (9) is inserted into the taper slit (10a) of the shock absorber (10), the oil (h) is introduced between the slide cylinder (9) and the shock absorber (10).

Figure 4B:
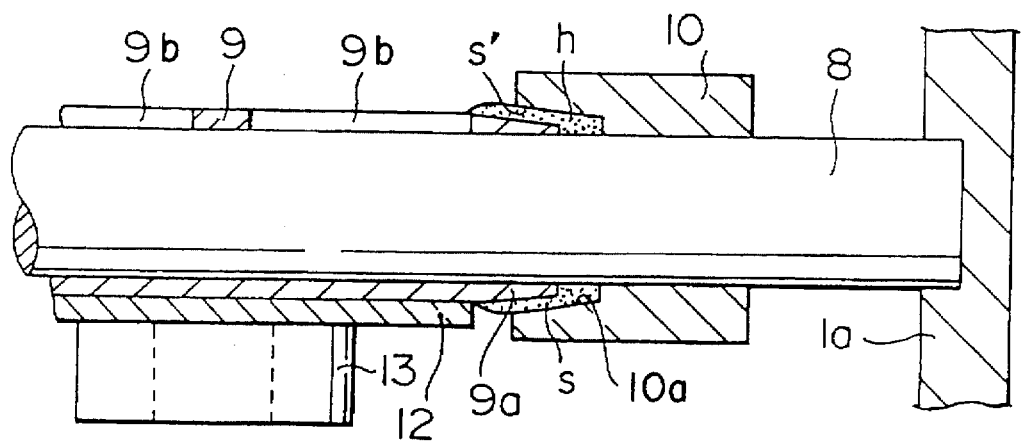

Next, as shown in FIG. 4B, when the taper (9a) of the slide cylinder (9) enters the taper slit (10a) of the shock absorber (10), the oil (h) between the slide cylinder (9) and the shock absorber (10) is ejected from the exit (s') of slit (s) formed by the taper (9a) of the slide cylinder (9) and the taper slit (10) of the shock absorber (10). Due to the mission resistance of this oil (h) from the exit (s') of the slit (s), a first braking action to the movement of slide cylinder (9) to the right is applied.

Figure 4C:
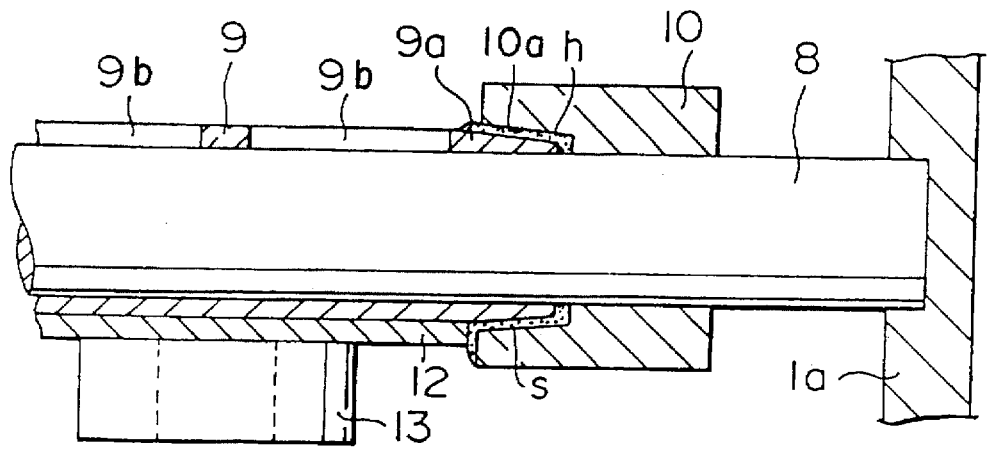

As shown in FIG. 4C, when the taper (9a) of the slide cylinder (9) further enters the taper slit (10a) of the shock absorber (10) and the width of the slit (s) becomes narrower, a sharp second braking action on the slide cylinder (9) that exponentially or non-linearly increases is applied due to the shear resistance of the oil (h) concentrated between the taper (9a) of the slide cylinder (9) and the taper slit (10a) of the shock absorber (10).

In this way, at the traverse return position, a sharp, non-linear braking resistance based on the emission resistance of the oil (h) and succeeding shear resistance of the oil (h) is exerted on the slide cylinder (9) due to the oil (h) intervening between the slide cylinder (9) and the shock absorber (10). Therefore, the impact force of the cam drum (4) and cam roller (13) at traverse return point is instantly reduced and the generation of noise is prevented.

Figure 5:
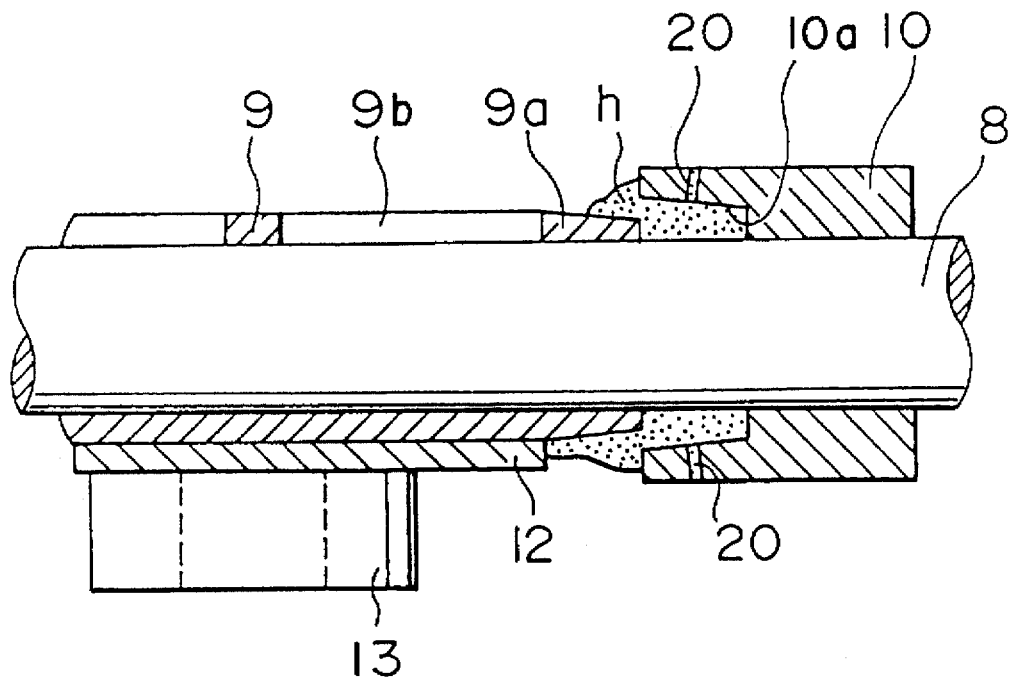
FIG. 5 is an enlarged vertical section view of the return point of the second embodiment of the present invention.

FIG. 5 shows a second embodiment of the present invention. It should be noted that the same references are used for the same parts as those in the aforementioned first embodiment.

In the present embodiment, a hole (20) is formed in one or a plurality of places in the taper slit (10a) part of the shock absorber (10). Due to the hole (20), the braking resistance of the slide cylinder (9) can be reduced and it is possible to set the braking resistance to one applicable to the size of the mass of the slide cylinder (9). In short, this is because the emission resistance of the oil (h) is small in comparison to the aforementioned embodiment.

Figure 6:
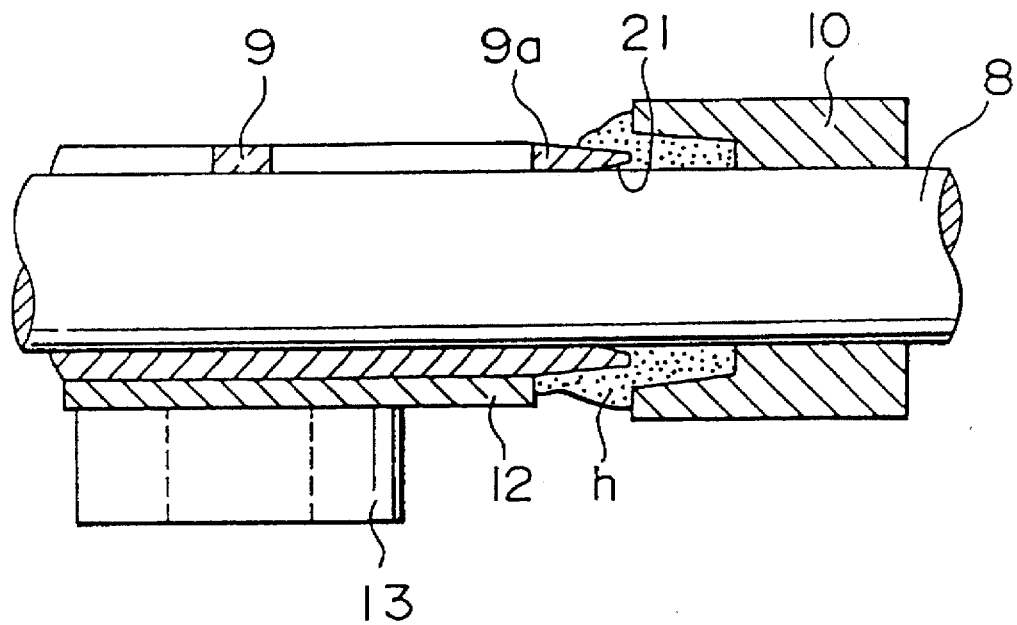
FIG. 6 is an enlarged vertical section view of the return point of the third embodiment of the present invention.

Furthermore, a third embodiment is shown in FIG. 6. It should be also noted that the same references are used for the same parts as those in the aforementioned first embodiment.

In the present embodiment, a further tapered part (21) is formed on the inside peripheral surface of the taper (9a) of the slide cylinder (9). In short, the taper (21) slanting at an angle of about 5° from the tip of slide cylinder (9) is formed. Due to that taper 21, it becomes easier for the oil (h) to penetrate the space between the slide cylinder (9) and the support shaft (8) when the slide cylinder (9) moves to the right of FIG. 6. Accordingly, the shear resistance of the oil (h) increases, the braking force of the slide cylinder (9) increases and the impact between the cam drum (4) and cam roller (13) at the traverse return is instantly reduced.

It should be noted that a suitable combination of the aforementioned first, second and third embodiments is possible and is the most favorable structure for factors such as weight of the slide cylinder (9) and traverse speed.

Furthermore, examples have been described where easily obtainable oil as a lubricating oil has been used but of course, the use of other viscous fluids is possible.

Also, FIG. 4 shows the taper angle of the taper slit (10a) and the taper angle of the taper (9a) of the slide cylinder (9) as the same angle and in this case, the slit (s) is parallel. It is not absolutely necessary for the aforementioned angles to be the same. For example, in FIG. 4C, when the angle of the taper (9a) of the slide cylinder (9) is bigger than the angle of the taper slit (10a), the exit (s') of the slit (s) becomes narrower and the emission resistance of the viscous fluid increases.

Due to the above described structure, the present invention is effective as stated below.

As the impact between the cam drum and cam roller is sharply non-linearly shock absorbered by the emission resistance and shear resistance of the viscous fluid, the noise generated when the cam roller returns can be reduced and the reduction in durability of the traverse apparatus because of that impact can be prevented.

As noise generated when the cam roller returns can be reduced due to the simple structure of the shock absorber, the slide cylinder (9) and the oil supply member and the like, the traverse apparatus can be reduced in size and a high speed traverse device can be realised.

As viscous fluid applied to the cam drum can be supplied to the support shaft by the oil supply pipe, there is no need for a drive source for a special oil supply pump etc and consequently, the traverse apparatus can be reduced in size and the maintenance inspection can be simplified.

What is claimed is:

1. A traverse apparatus for a yarn winding machine comprising:
   a reciprocally moving slide member which is connected to a traverse rod, wherein said slide member includes two slide cylinders connected by a connecting block and said traverse rod is connected to said connecting block;
   a shock absorber means for absorbing a shock caused when a tapered end of said slide member contacts a tapered slit of said shock absorber means, said tapered end of said slide member fitting into said tapered slit of said shock absorber means; and
   a viscous fluid intervening between said shock absorber means and said slide member so that said shock is non-linearly buffered by any one of an emission resistance and a shear resistance of said viscous fluid.

2. A traverse apparatus for a yarn winding machine as claimed in claim 1, further comprising a cam drum rotating on a shaft, wherein said cam dram has a cam groove in a circumferential surface and said cam groove mates with a cam roller mounted on said connecting block of said slide member so that said slide member may carry out a reciprocating motion on a pair of support shafts.

3. A traverse apparatus for a yarn winding machine as claimed in claim 1, wherein a hole is formed in said shock absorber means between an outer circumferential surface of said shock absorber means and said tapered slit of said shock absorber means to let said viscous fluid escape from said tapered slit of said shock absorber means.

4. A traverse apparatus for a yarn winding machine as claimed in claim 1, wherein said tapered end of said slide member comprised a tapered end on each first and second ends of said slide cylinders.

5. A traverse apparatus for a yarn winding machine as claimed in claim 1, further comprising a means for supplying said viscous fluid to said support shafts supporting said slide member.

6. A traverse apparatus for a yarn winding machine as claimed in claim 5, wherein said means for supplying said viscous fluid is a supply pipe that supplies said viscous fluid.

7. A traverse apparatus for a yarn winding machine comprising:
   a hollow cam box having a top wall, a bottom wall and first and second pairs of opposed side walls;
   first and second parallel support shafts, wherein said first and second support shafts each have first and second ends supported between said first pair of opposed side walls within said cam box;
   a reciprocally moving slide means for sliding back and forth on said first and second support shafts, said slide means comprising first and second cylinders slidably mounted on said first and second support shafts, respectively, and connected to each other by a connecting block which is connected to a traverse rod wherein said first and second cylinders each have first and second tapered ends;
   a shock absorber means, positioned at each of said first and second ends of said support shaft, for absorbing a shock which occurs when any one of said first and second tapered ends of said first and second cylinders of said slide means contacts a tapered slit of said shock absorber; and
   a viscous fluid intervening between said shock absorber means and said slide means so that said shock is non-linearly buffered by any one of an emission resistance and a shear resistance of said viscous fluid.

8. A traverse apparatus for a yarn winding machine as claimed in claim 7, wherein said viscous fluid is oil.

9. A traverse apparatus for a yarn winding machine as claimed in claim 8, further including traverse rod support members for supporting said support shafts.

10. A traverse apparatus for a yarn winding machine as claimed in claim 9, further comprising a cam drum on a rotating shaft supported between said first pair of opposed walls beneath and parallel to said support shafts, wherein said cam drum has a helical cam groove in a circumferential surface thereof and said cam groove mates with a cam roller mounted on said connecting block of said slide means in order for said slide means to reciprocate back and forth on said first and second support shafts.

11. A traverse apparatus for a yarn winding machine as claims in claim 10, further said traverse rod having a first end attached to said connecting block and a second end connected to traverse guides corresponding to a plurality of winding units of said winding machine and causing said traverse rod to translate back and forth so that said slide means translates back and forth.

12. A traverse apparatus for a yarn winging machine as claimed in claim 11, further comprising a belt and pulley arrangement attached outside said hollow cam box to said rotating shaft on which said cam drum is rotatingly supported.

13. A traverse apparatus for a yarn winding machine as claimed in claim 12, wherein a hole is formed in said shock absorber means between an outer circumferential surface of said shock absorber means and said tapered slit of said shock absorber means to let said viscous fluid escape from said tapered slit of said shock absorber means.

14. A traverse apparatus for a yarn winding machine as claimed in claim 13, further comprising a means for supplying said oil to said support shaft of said slide member.

15. A traverse apparatus for a yarn winding machine as claimed in claim 14, wherein said means for supplying said oil is an oil supply pipe that supplies oil to said support shaft through elongated holes of said slide cylinders.

16. A traverse apparatus for a yarn winding machine as claimed in claim 15, wherein said hollow cam box has an oil reservoir on said bottom wall thereof and said oil reservoir contacts said cam drum as said cam drum rotates on said rotating shaft which is bearing mounted on said first opposed side walls of said cam box, said cam drum thus collecting a coating of oil on said circumferential surface thereof.

17. A transverse apparatus for a yarn winding machine as claimed in claim 16, further comprising a scrape-off plate, said scrape-off having a tip attached perpendicular thereto, said tip scraping oil off of said rotating drum and into said oil supply pipe.

18. A transverse apparatus for a yarn winding machine as claimed in claim 17, further comprising a conduit pipe shaped part for cooperating with said tip to scrape oil off said circumferential surface of said cam drum to supply said oil to said oil supply pipe.

19. A transverse apparatus for a yarn winding machine as claimed in claim 18, wherein said oil pipe supplies oil to said elongated holes of said slide cylinders which allows said oil to reach said first and second support shafts to intervene between said tapered ends of said slide cylinders and said tapered slit of said shock absorber means.

* * * * *